US010917672B2

(12) United States Patent
Loheide et al.

(10) Patent No.: US 10,917,672 B2
(45) Date of Patent: Feb. 9, 2021

(54) DYNAMIC CHANNEL VERSIONING IN A BROADCAST AIR CHAIN BASED ON USER-PREFERENCES

(71) Applicant: Turner Broadcasting Systems, Inc., Atlanta, GA (US)

(72) Inventors: Donald Jude Loheide, Mableton, GA (US); Nishith Kumar Sinha, Mableton, GA (US); Mark Cooper Pope, V, Atlanta, GA (US)

(73) Assignee: TURNER BROADCASTING SYSTEM, INC., Atlanta, GA (US)

( * ) Notice: Subject to any disclaimer, the term of this patent is extended or adjusted under 35 U.S.C. 154(b) by 0 days.

(21) Appl. No.: 16/592,394

(22) Filed: Oct. 3, 2019

(65) Prior Publication Data

US 2020/0037013 A1    Jan. 30, 2020

Related U.S. Application Data

(63) Continuation of application No. 15/396,624, filed on Dec. 31, 2016, now Pat. No. 10,694,231.

(51) Int. Cl.
*H04N 21/236* (2011.01)
*H04N 21/2187* (2011.01)
(Continued)

(52) U.S. Cl.
CPC ... *H04N 21/23614* (2013.01); *H04N 21/2187* (2013.01); *H04N 21/21815* (2013.01);
(Continued)

(58) Field of Classification Search
CPC ......... H04N 21/21815; H04N 21/2187; H04N 21/23614; H04N 21/25891;
(Continued)

(56) References Cited

U.S. PATENT DOCUMENTS 7,146,627 B1    12/2006 Ismail et al.
2006/0287915 A1    12/2006 Boulet et al.
(Continued)

OTHER PUBLICATIONS

Advisory Action for U.S. Appl. No. 15/396,614 dated Oct. 24, 2019.
(Continued)

*Primary Examiner* — Omar S Parra
(74) *Attorney, Agent, or Firm* — Chip Law Group

(57) ABSTRACT

A media content packaging and distribution system that controls distribution of a channel to be viewed on a plurality of user-computing devices associated with a plurality of specific subscriber accounts, receives a plurality of user-preferences from at least one of the plurality of user-computing devices over one or more communication mediums, and generate a plurality of customized media feeds of a media feed of the channel, based on at least the received plurality of user-preferences. The generated plurality of customized media feeds represents a plurality of user-specific versions of the channel. The plurality of customized media feeds is communicated over the one or more communication mediums to be viewed on the plurality of user-computing devices. The media feed corresponds to at least one of a live media feed, or a stored media feed, and the plurality of user-computing devices is associated with one or more regions.

18 Claims, 5 Drawing Sheets

(51) Int. Cl.
*H04N 21/218* (2011.01)
*H04N 21/258* (2011.01)
*H04N 21/845* (2011.01)
*H04N 21/81* (2011.01)
*H04N 21/262* (2011.01)
*H04N 21/2668* (2011.01)

(52) U.S. Cl.
CPC ... *H04N 21/25891* (2013.01); *H04N 21/2668* (2013.01); *H04N 21/26258* (2013.01); *H04N 21/812* (2013.01); *H04N 21/8456* (2013.01)

(58) Field of Classification Search
CPC ......... H04N 21/26258; H04N 21/2668; H04N 21/812; H04N 21/8456; H04N 21/25; H04N 21/251; H04N 21/252
See application file for complete search history.

(56) References Cited

U.S. PATENT DOCUMENTS

| | | |
|---|---|---|
| 2007/0089141 A1 | 4/2007 | Gordon et al. |
| 2007/0204292 A1 | 8/2007 | Riedl et al. |
| 2007/0249367 A1 | 10/2007 | Sato et al. |
| 2008/0052741 A1 | 2/2008 | Dharmaji |
| 2012/0066066 A1 | 3/2012 | Jain et al. |
| 2012/0284746 A1 | 11/2012 | Evans et al. |
| 2013/0339991 A1 | 12/2013 | Ricci |
| 2014/0143806 A1* | 5/2014 | Steinberg ......... H04N 21/23424 725/34 |
| 2014/0173666 A1* | 6/2014 | Gordon ............... H04N 21/2665 725/51 |
| 2016/0073176 A1 | 3/2016 | Phillips et al. |
| 2016/0150257 A1* | 5/2016 | Sokolov ........... H04N 21/25435 725/8 |
| 2017/0034591 A1 | 2/2017 | Ray et al. |
| 2017/0201779 A1* | 7/2017 | Publicover ......... H04N 21/4532 |

OTHER PUBLICATIONS

Non-Final Office Action for U.S. Appl. No. 15/396,624 dated Oct. 16, 2019.
Notice of Allowance for U.S. Appl. No. 15/396,614 dated Jan. 2, 2020.
Corrected Notice of Allowance for U.S. Appl. No. 15/396,614 dated Apr. 7, 2020.
Notice of Allowance for U.S. Appl. No. 15/396,624 dated Feb. 12, 2020.
Corrected Notice of Allowability for U.S. Appl. No. 15/396,624 dated May 21, 2020.
Final Office Action for U.S. Appl. No. 16/592,394 dated Jun. 23, 2020.

* cited by examiner

DYNAMIC CHANNEL VERSIONING IN A BROADCAST AIR CHAIN BASED ON USER-PREFERENCES

CROSS-REFERENCE TO RELATED APPLICATIONS/INCORPORATION BY REFERENCE

This patent application makes reference to, claims priority to, claims the benefit of, and is a Continuation Application of U.S. patent application Ser. No. 15/396,624, filed Dec. 31, 2016.

This application also makes reference to:
U.S. application Ser. No. 15/396,614, filed Dec. 31, 2016.

Each of the above referenced patent applications is hereby incorporated herein by reference in its entirety

FIELD OF TECHNOLOGY

Certain embodiments of the disclosure relate to a media content packaging and distribution system. More specifically, certain embodiments of the disclosure relate to a method and system for dynamic channel versioning in a broadcast air chain based on user preferences.

BACKGROUND

Advancements in the television and broadcasting sector have led to the development of various technologies and broadcasting platforms that are changing the way consumers access and view media content. Broadcasting platforms usually refer to the types of networks that are used to deliver a broadcast feed to the viewer. A network provider (network operator) usually decides what shows (programming content) to air in the upcoming broadcast year and when to air them. A programming schedule defines an aggregate capacity of non-programming airtime, which may be filled with various non-programming content, such as commercials, promos, and/or the like. Thereafter, based on the programming schedule, the programming content and the non-programming content may be broadcasted, to be viewed on various computing devices (e.g., televisions) by the viewers.

Traditionally, the network provider broadcasts the same programming and non-programming content through a subscribed channel to the viewers within different geographical regions. However, in certain scenarios, the received non-programming content may not be relevant to the preferences, likes, or dislikes of viewers due to their respective geographical regions. In such scenarios, it may be difficult for the network provider to broadcast the content through different channels for viewer residing in different geographical regions. Such problem may be tackled but requires installation of substantial infrastructure and resources that may increase overall operating and maintaining cost of the network provider.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for dynamic channel versioning in a broadcast air chain based on user preferences, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in a method and system for dynamic channel versioning in a broadcast air chain based on user preferences. Various embodiments of the disclosure provide a method and system that controls distribution of a channel to be viewed on a plurality of user-computing devices associated with a plurality of regions. The region may be representative of at least one of a geographic region, a marketing region or zone, a demographics region, and/or a logical boundary. Various embodiments of the disclosure generate a plurality of customized media feeds for a media feed to be viewed on the plurality of user-computing devices. The generation of the plurality of customized media feeds makes optimal use of available endpoint data that includes at least information related to the plurality of regions of a plurality of users to provide different versions of the channel to the plurality of users.

In accordance with various embodiments of the disclosure, the media content packaging and distribution system may further control the distribution of a channel to be viewed on at least one a plurality of user-computing devices associated with a plurality of specific subscriber accounts. A plurality of user-preferences is received from the plurality of user-computing devices over one or more communication mediums. A plurality of customized media feeds of a media feed of the channel is generated based on at least the received plurality of user-preferences. The received media feed corresponds to at least one of a live media feed, or a stored media feed. The generated plurality of customized media feeds may represent a plurality of user-specific versions of the channel. The generated plurality of customized media feeds to be viewed on at least one of the plurality of user-computing devices may be communicated over the one or more communication mediums.

In accordance with an embodiment, the communication of the generated plurality of customized media feeds to be viewed on the plurality of user-computing devices may be controlled. The control may be done such that a generated customized media feed to be viewed on a user-computing device of the plurality of user-computing devices is different from remaining generated customized media feeds of the generated plurality of customized media feeds. The remaining generated customized media feeds of the generated plurality of customized media feeds may be viewed on at least one remaining user-computing devices of the plurality of user-computing devices. The plurality of user-computing devices may be associated with one or more regions.

Figure 1A:
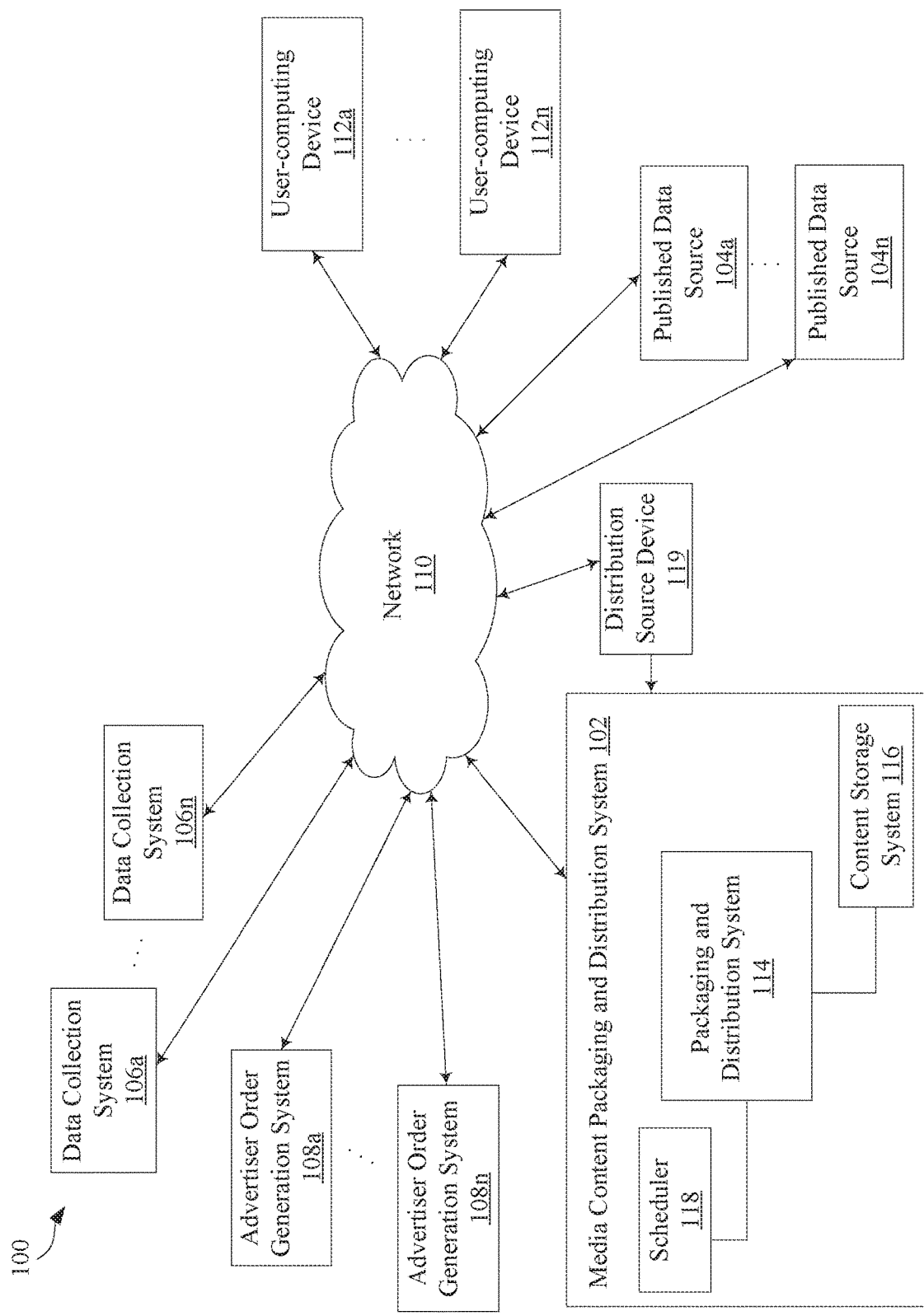
FIG. 1A is a block diagram that illustrates an exemplary system for dynamic channel versioning in a broadcast air chain based on user preferences, in accordance with an exemplary embodiment of the disclosure.

FIG. 1A is a block diagram that illustrates an exemplary system for dynamic channel versioning in a broadcast air chain, in accordance with an exemplary embodiment of the disclosure. Referring to FIG. 1A, there is shown a system 100 that comprises a media content packaging and distribution system 102 that is communicatively coupled to published data sources 104a, . . . , 104n, data collection systems 106a, . . . , 106n, and advertiser order generation systems 108a, . . . , 108n, via a network 110. There is shown a plurality of user-computing devices 112a, . . . , 112n that are communicatively coupled to the network 110. The media content packaging and distribution system 102 may comprise a packaging and distribution system 114, a content storage system 116, and a scheduler 118. There is also shown a distribution source device 119 communicatively coupled to the media content packaging and distribution system 102 and the network 110.

The media content packaging and distribution system 102 may comprise suitable logic, circuitry, and interfaces that may be configured to execute code that handles distribution of content comprising audio, video, and/or data. The media content packaging and distribution system 102 may be operated by a broadcasting company, which may be referred to as a broadcast provider (or broadcast operator), or a network provider (or network operator). The broadcast provider may handle a single channel, a plurality of channels, or one or more networks. The broadcast provider may be operable to distribute content via one or more channels, for example, traditional over-the-air broadcast channels, cable television networks, satellite communication networks, the Internet, and/or other content delivery networks (CDNs).

Each of the published data sources 104a, . . . , 104n may be communicatively coupled to one or more television networks and may comprise suitable logic, circuitry, and interfaces that may be configured to execute code that provides actual audiences for programs that were aired. As illustrated in FIG. 1A, the published data sources 104a, . . . , 104n are communicatively coupled to the media content packaging and distribution system 102, via the network 110. An exemplary published data source may be Nielsen. Another exemplary published data source may be a published database that provides ratings for a media item, such as gross rating point (GRP) or other metric. The GRP is an advertising impact measure or a promotion impact measure for each advertising and/or promotional campaigns, known in the art.

Each of the data collection systems 106a, . . . , 106n may comprise suitable logic, circuitry, and interfaces that may be configured to execute code to collect data from a plurality of data sources, such as one or more social networking platforms and one or more sensing devices (for example, temperature sensors, barometer, and/or the like), via one or more communication mediums, such as the network 110. The plurality of data sources may be associated with a plurality of regions. The at least one of the plurality of regions may comprise a geographic region, a marketing region or zone, a demographics region, and/or a logical boundary. The collected data may include at least information related to the plurality of regions, for example, weather information. The collected data may further include at least one of demographic data, media-viewing pattern data, or station IDs. The media content packaging and distribution system 102 may be configured to electronically receive, via the network 110, the collected data that corresponds to the plurality of regions from the data collection systems 106a, . . . , 106n.

Each of the advertiser order generation systems 108a, . . . , 108n may comprise suitable logic, circuitry, and interfaces that may be configured to place orders with the broadcasting company that include information about type of advertisements to broadcast, the number of advertisements to broadcast, and when should the advertisements be aired. The placed order may correspond to the advertisements that are associated with the plurality of regions. The media content packaging and distribution system 102 may be configured to electronically receive, via the network 110, deals comprising advertisers' orders from the advertiser order generation systems 108a, . . . , 108n. The advertiser order generation systems 108a, . . . , 108n may be associated with the plurality of regions.

The network 110 may be any kind of network, or a combination of various networks, and it is shown illustrating the communication that may occur between the media content packaging and distribution system 102 and the published data sources 104a, . . . , 104n, the data collection systems 106a, . . . , 106n, and/or the advertiser order generation systems 108a, . . . , 108n. For example, the network 110 may comprise one or more of a cable television network, the Internet, a satellite communication network, a wide area network (WAN), a medium area network (MAN), a local area network (LAN), an analogue terrestrial network, a digital terrestrial network, a direct-to-home satellite network, cable, an Internet Protocol (IP), and an over-the-top television (OTT) network.

Each of the plurality of user-computing devices 112a, . . . , 112n may refer to an end-user device where the content (for example, the programming content and/or the non-programming content) may be streamed to be viewed by a viewer. Examples of the plurality of user-computing devices 112a, . . . , 112n may include, but are not limited to, connected TVs, connected TV with paired devices (e.g., tablets), and second screen devices, such as smartphones and tablets.

The packaging and distribution system 114 may comprise suitable logic, circuitry, and interfaces that may be configured to execute code to control packaging of the programming content with the non-programming content, and thereafter, distribution (broadcast, simulcast, multicasting, stream on a channel) of the packaged content to the user-computing devices 112a, . . . , 112n, via the network 110. The packaging and distribution system 114 may receive a media feed (e.g. audio feed or video feed) that corresponds to the programming content from the distribution source device 119 associated with the broadcast provider. Further, the packaging and distribution system 114 may determine a plurality of segments of the received media feed based on one or more inbound triggers associated with the received media feed. The packaging and distribution system 114 may further determine targeted content based on at least the collected data that corresponds to the plurality of regions. Further, based on a schedule generated by the scheduler 118, the packaging and distribution system 114 may execute media stitching of the plurality of segments and the determined targeted content to generate a plurality of customized media feeds (e.g. audio feeds and/or video feeds) of the received media feed. For example, the media stitching may include a replacement of a segment of the plurality of segments with the determined targeted content. In another example, the media stitching may include an insertion or addition of the determined targeted content among the plurality of segments. In yet another example, the media stitching may further include a re-ordering of the plurality of segments along with the insertion of the determined targeted content (or replacement of a segment with the determined targeted content). Each of the plurality of customized media feeds may correspond to each of the plurality of regions. The packaging and distribution system 114 may further broadcast the generated plurality of customized media feeds to be viewed on the plurality of user-computing devices 112a, . . . , 112n, via one or more communication mediums, such as the network 110.

The content storage system 116 may comprise suitable logic, circuitry, and interfaces that may be configured to execute code to temporarily store live recording data of an event in a storage buffer system. The content storage system 116 may be further configured to store the received media feed from one or more broadcast source devices. The content storage system 116 may be further configured to maintain a repository of various programming data, such as movies, music videos, documentary videos, and/or the like, in the storage buffer system. Metadata associated with the various programming content and/or non-programming content may be further stored in the content storage system 116. The metadata may include rules or rules related to the programming content and/or non-programming content. For example, the metadata may specify whether or not the programming content and/or non-programming content may be archived, and if so, when and where it may be archived. The metadata may also specify whether or not the programming content and/or non-programming content may be blocked (blocked-out), and if so where and what portions may be blocked.

The scheduler 118 may comprise suitable logic, circuitry, and interfaces that may be configured to execute a code that handles a programming schedule of the channel. The programming schedule of a channel defines what media content should be scheduled, the ordering of the media content during playout, and when to distribute media. The content that is distributed may include both the programming content, such as TV programs, and the non-programming content, such as advertisements or promotional media. In accordance with an embodiment, the programming schedule may be a text file or an XML file, that comprise a reference mapping of different media content items that needs to be stitched by a stream manipulator 122 (described, for example, in FIG. 1B). The programming schedule may further be configured to indicate a start and an end of one or more portions of the programming content and/or the non-programming content during distribution of the programming content and the non-programming content on the channel to be viewed on the plurality of user-computing devices 112a, . . . , 112n. The programming schedule of the channel may be determined for a time period defined by the broadcast or network provider (network operator). The scheduler 118 may receive a programming schedule of an existing channel from the distribution source device 119. The scheduler 118 may modify the received programming schedule to include the determined targeted content.

The distribution source device 119 may comprise suitable logic, circuitry, and interfaces that may be configured to communicate a media feed and a programming schedule of a channel, such as an existing channel, to the media content packaging and distribution system 102. In accordance with an embodiment, the media feed of the channel may correspond to a broadcast feed. The source device 119 may be communicatively coupled to the network 110.

In operation, the media content packaging and distribution system 102 may be configured to control distribution of a channel to be viewed on the plurality of user-computing devices 112a, . . . , 112n. The plurality of user-computing devices 112a, . . . , 112n may be associated with a plurality of regions. For example, each of the plurality of user-computing devices 112a, . . . , 112n may be associated with a corresponding region of the plurality of regions. In another example, more than one user-computing devices may be associated with a region of the plurality of regions. The media content packaging and distribution system 102 may receive a media feed of the channel from the distribution source device 119 over a communication network, such as the network 110. Further, the packaging and distribution system 114 may determine a plurality of segments of the media feed based on one or more inbound triggers detected in the received media feed. The media content packaging and distribution system 102 may further receive defined endpoint data from the data collection systems 106a, . . . , 106n. The defined endpoint data, collected by the data collection systems 106a, . . . , 106n, may include at least information related to the plurality of regions. The defined endpoint data may be collected based on instructions defined by a broadcast or network provider (network operator). The defined endpoint data may further include at least one of demographic data, media-viewing pattern data, and station IDs. Based on the collected endpoint data, the packaging and distribution system 114 may determine targeted content for the plurality of segments of the received media feed for each of the plurality of regions. Thereafter, the packaging and distribution system 114 may be configured to generate a plurality of customized media feeds of the received media feed. The packaging and distribution system 114 may generate the plurality of customized media feeds based on media stitching of the plurality of segments of the received media feed and the determined targeted content for the plurality of geographic regions. The generated plurality of customized media feeds may represent a plurality of versions of the channel. The packaging and distribution system 114 may further distribute the generated plurality of customized media feeds on the channel to be viewed on the plurality of user-computing devices 112a, . . . , 112n. A customized media feed of the plurality of customized media feeds to be viewed on a set of user-computing devices, such as 112a, . . . , 112c, of the plurality of user-computing devices 112a, . . . , 112n corresponds to a region, such as "G1", of the plurality of regions. The distribution of the generated customized media feed to be viewed on the plurality of user-computing devices 112a, . . . , 112n of the region may be controlled such that the generated customized media feed is different from remaining customized media feeds of the plurality of customized media feeds. The remaining customized media feeds of the plurality of customized media feeds may be viewed on remaining user-computing devices, such as 112d, . . . , 112n, of the plurality of user-computing devices 112a, . . . , 112n located at remaining regions, such as "G2", "G3", and "G4", of the plurality of regions.

In accordance with an exemplary aspect of the disclosure, the media content packaging and distribution system 102 may be configured to control distribution of a channel to be viewed on at least one of the plurality of user-computing devices 112a, . . . , 112n. The plurality of user-computing devices 112a, . . . , 112n may be associated with a plurality of specific subscriber accounts. The plurality of user-computing devices 112a, . . . , 112n may be further associated with one or more regions. The media content packaging and distribution system 102 may receive a plurality of user-preferences from the plurality of user-computing devices 112a, . . . , 112n over one or more communication mediums or a distribution system, such as the network 110. The media content packaging and distribution system 102 may further receive a media feed of the channel from the broadcast source device 119 over a communication network, such as the network 110. The packaging and distribution system 114 may determine a plurality of segments of the received media feed based on the received plurality of user-preferences. For example, if one user-preference is received from a user-computing device of the plurality of user-computing devices 112a, . . . , 112n, then at least two segments of the received media feed may be determined. Further, based on the received plurality of user-preferences, the packaging and distribution system 114 may determine targeted content for each of the plurality of user-computing devices 112a, . . . , 112n. Thereafter, the packaging and distribution system 114 may be configured to generate the plurality of customized media feeds of the received media feed. The packaging and distribution system 114 may generate the plurality of customized media feeds based on video stitching of the plurality of segments of the received media feed and the determined targeted content for the plurality of user-computing devices 112a, . . . , 112n. The generated plurality of customized media feeds may represent a plurality of user-specific versions of the channel. The generated plurality of customized media feeds to be viewed on the plurality of user-computing devices 112a, . . . , 112n may be communicated over the one or more communication mediums, such as the network 110. The communication of the generated plurality of customized media feeds to be viewed on the plurality of user-computing devices 112a, . . . , 112n may be controlled such that a generated customized media feed to be viewed on the user-computing device may be different from remaining generated customized media feeds of the generated plurality of customized media feeds. The remaining generated customized media feeds may be viewed on at least one remaining user-computing devices of the plurality of user-computing devices 112a, . . . , 112n.

Figure 1B:
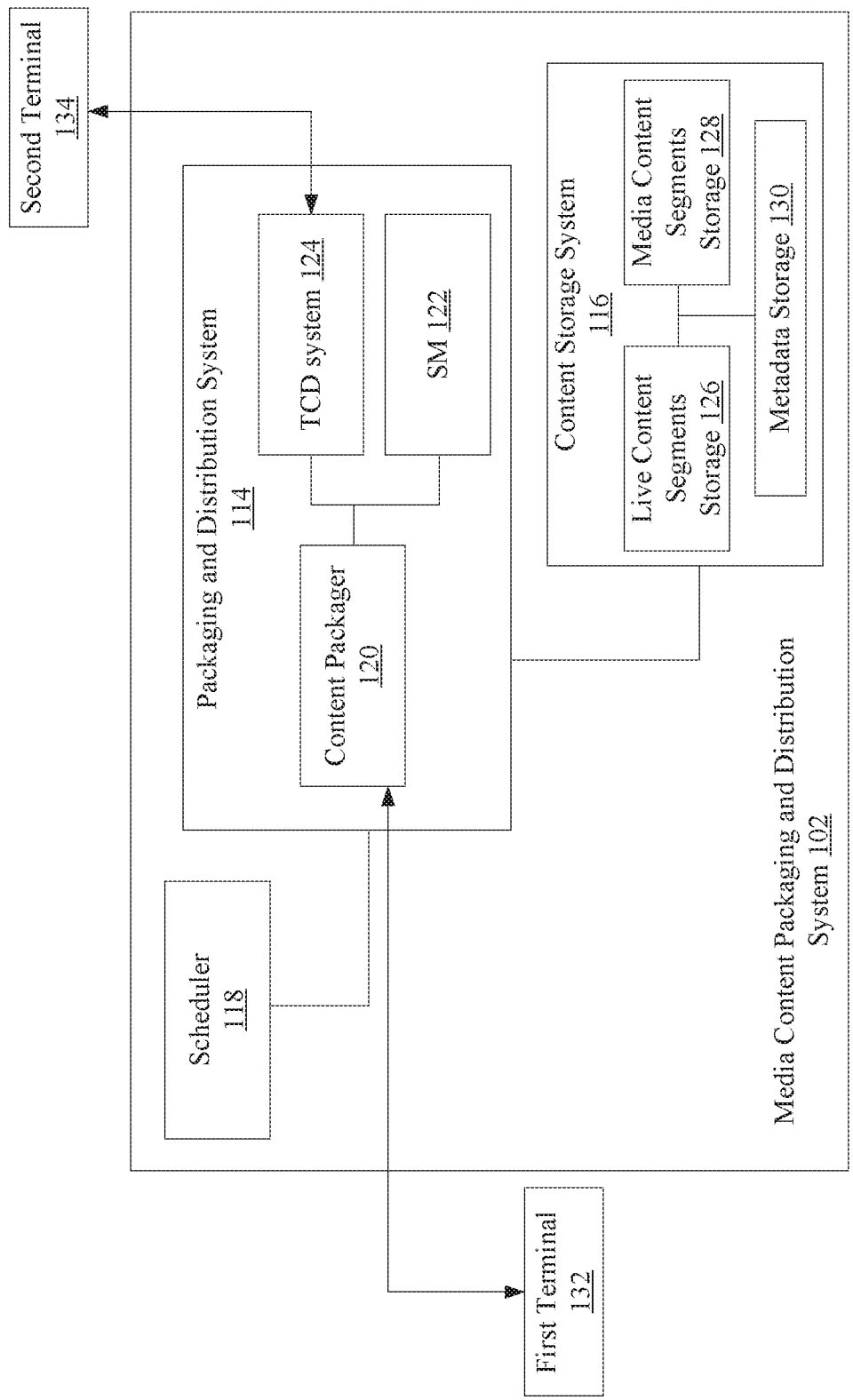
FIG. 1B is a block diagram that illustrates an exemplary media content packaging and distribution system for dynamic channel versioning in a broadcast air chain based on user preferences, in accordance with an exemplary embodiment of the disclosure.

FIG. 1B is a block diagram that illustrates an exemplary media content packaging and distribution system for dynamic channel versioning in a broadcast air chain, in accordance with an exemplary embodiment of the disclosure. Referring to FIG. 1B, the media content packaging and distribution system 102 may further comprise a content packager 120, the SM 122, a targeted content determination (TCD) system 124, a live content segments storage content segments storage 126, a media content (e.g. audio on demand and/or video on demand (VOD)) content segments storage 128, a metadata storage 130, and one or more terminals, such as a first terminal 132 associated with a user, such as a broadcast or network provider (or operator), and a second terminal 134 associated with a user, such as a sales user. The sales user may utilize the second terminal 134 to define endpoint data. There is also shown the packaging and distribution system 114, the content storage system 116, and the scheduler 118, as described in FIG. 1A.

In some embodiments of the disclosure, the packaging and distribution system 114, the content storage system 116, and the scheduler 118 may be integrated to form an integrated system. In some embodiments of the disclosure, as shown, the packaging and distribution system 114 may be distinct from the content storage system 116 and the scheduler 118. In some embodiments of the disclosure, the content packager 120, the SM 122, and the TCD system 124 may be integrated as part of the packaging and distribution system 114 to form an integrated system, as shown. In some embodiments of the disclosure, each of the content packager 120, the SM 122, and the TCD system 124 may be located separately from the packaging and distribution system 114. Similarly, in some embodiments of the disclosure, the live content segments storage 126, the media content segments storage 128, the metadata storage 130 may be integrated as part of the content storage system 116 to form an integrated system, as shown. In some embodiments of the disclosure, each of the live content segments storage 126, the MEDIA content segments storage 128, and the metadata storage 130 may be located separately from the content storage system 116.

The content packager 120 may comprise suitable logic, circuitry, and interfaces that may be configured to execute code to receive programming and/or non-programming content from one or more sources in one or more input formats and convert the received programming and/or non-programming content from the one or more input formats to one or more corresponding output formats. In this regard, for example, the content packager 120 may be operable to receive one or more MPEG2 transport stream (TS) and convert the corresponding content to one or more output formats (for example, various hypertext transfer protocol (HTTP) formats, such as HLS, protected HLS, Smooth Streams, and dynamic adaptive streaming over HTTP (Dash)) based on, for example, a target user-computing device. The content packager 120 may be configured to execute code that handles packaging of the programming content and/or the non-programming content. The content packager 120 interfaces with various hardware components in the media content packaging and distribution system 102, for example, the SM 122, the TCD system 124, the live content segments storage 126, the MEDIA content segments storage 128, the metadata storage 130, the scheduler 118, and/or the first terminal 132. The content packager 120 may be configured to receive a media feed from the distribution source device 119, via, for example, the first terminal 132. In another example, the content packager 120 may receive (or retrieve) the media feed from the content storage system 116, such as the live content segments storage 126 or the MEDIA content segments storage 128. The content packager 120 may be configured to retrieve metadata, for example, one or more inbound triggers of the programming content, such as the received media feed, from the metadata storage 130. Based on at least the one or more inbound triggers of the received media feed, the content packager 120 may determine a plurality of segments of the received media feed. In accordance with an embodiment, the content packager 120 may be further configured to determine one or more spots in the determined plurality of segments. The one or more spots may be utilized for inserting the non-programming content or other desired content based on a plurality of regions.

The SM 122 may comprise suitable logic, circuitry, and interfaces that may be configured to execute code to stitch one or more media items (such as the plurality of segments and the determined targeted content) in accordance with the programming schedule, to generate a customized version of the content for specific use cases. For example, the SM 122 may execute media stitching of the determined plurality of segments of the received media feed and the targeted content determined for a region of the plurality of regions. Based on the media stitching of the determined plurality of segments and the determined targeted content for the region, the SM 122 may generate a customized media feed of the channel to be viewed on a set of user-computing devices of the plurality of user-computing devices 112a, . . . , 112n associated with the region. In accordance with an embodiment, the SM 122 may be configured to execute media stitching based on one or more modifications of a programming schedule of the channel which may be done in real time or near-real time. The one or more modifications of the programming schedule may be driven based on the determination of targeted content. The SM 122 may comprise a system for converting pre-encoded media content for live distribution.

The TCD system 124 may comprise suitable logic, circuitry, and interfaces that may be configured to generate the targeted content. For example, the TCD system 124 may execute code that handles generation of the targeted content for each of the plurality of regions. The TCD system 124 may be configured to acquire or receive data, for example, defined endpoint data collected by the data collection systems 106a, . . . , 106n. The defined endpoint data may include information that indicate, for example, weather or traffic conditions, related to the plurality of regions. Based on the defined endpoint data that corresponds to each of the plurality of regions, the TCD system 124 may determine the targeted content for the respective plurality of regions. The determined targeted content may correspond to multimedia content, such as at least one of a video, audio, animation, or text content.

The live content segments storage 126 may comprise suitable logic, circuitry, and interfaces that may be configured to store live content segments of one or more real-time content streams of channels, for example, a live media feed of a CNN channel. Such live media feed may be distributed in real-time on the channel to be viewed on the plurality of user-computing devices 112a, . . . , 112n. The live content storage system 126 may be communicatively coupled to the network 110 to receive the one or more live media feeds of channels.

The media content segments storage 128 may comprise suitable logic, circuitry, and interfaces that may be configured to store one or more pre-encoded media content segments of non-real time programming data, for example, movies, music videos, clips of various shows or programs, and/or the like. Such one or more pre-encoded media content segments may be distributed on the channel to be viewed on the plurality of user-computing devices 112a, . . . , 112n, based on a demand by the broadcast provider or users. The media content segments storage 128 may be communicatively coupled to the network 110. The media content segments storage 128 may include pre-encoded media assets.

The metadata storage 130 may comprise suitable logic, circuitry, and interfaces that may be configured to store metadata of the programming and/or non-programming content. For example, the metadata storage 130 may store the metadata that include rules related to the programming content and/or non-programming content. For example, the metadata may specify whether or not the programming content and/or non-programming content may be archived, and if so when and where can it be archived. The metadata may also specify whether or not the programming content and/or non-programming content may be blocked out, and if so where and what portions may be blocked out. The metadata may further include the one or more inbound triggers of the programming content and/or the non-programming content. The metadata may further include one or more attributes of the programming content and/or the non-programming content, such as start time and end time of one or more portions of the programming content and/or the non-programming content.

In accordance with an embodiment, the metadata storage 130 may include metadata associated with live content segments of one or more live feeds of channels stored in the live content storage system 126. The metadata storage 130 may include metadata associated with media content segments stored in the media content storage system 128. Other examples of the metadata may include a media item identifier, a title of the media item, a short summary of the content segments, a file format, encryption information, length of the media item, a date and/or time the media item was added to the catalog of media items, a new item indicator for the media item, a media item class, for example, a television show, a cartoon program, a movie, a news media, an episode, a game, a clip, a recorded sports event, interactive media, and/or the like. In accordance with an embodiment, the metadata may also store program-specific information (PSI) data as defined by ISO/IEC13818-1 (MPEG-2), closed captioning data, and one or more inbound triggers of the live media feed associated with the live content segments stored in the live content segments storage 126. The functions and/or operations performed by the media content packaging and distribution system 102, and its various components, are further described, in FIGS. 2, 3, and 4.

Figure 2:
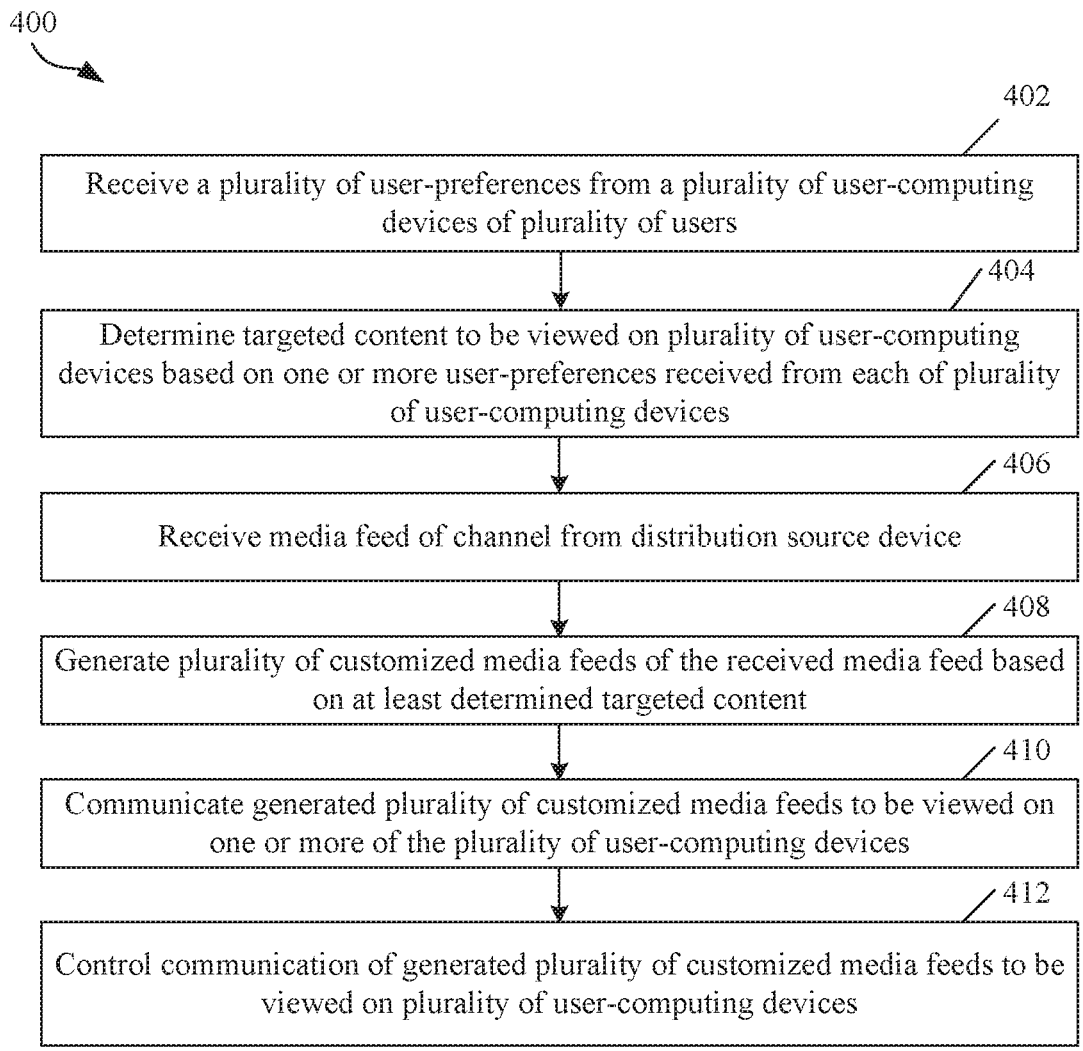
FIG. 2 is a flow chart illustrating exemplary operations for dynamic channel versioning in a broadcast air chain based on user-preferences, in accordance with an exemplary embodiment of the disclosure.

FIG. 2 is a flow chart illustrating exemplary operations for dynamic channel versioning in a broadcast air chain based on user-preferences, in accordance with an exemplary embodiment of the disclosure. Referring to FIG. 2, there is shown a flow chart 400 comprising exemplary operations 402 through 412.

At 402, a plurality of user-preferences may be received from the plurality of user-computing devices 112a, . . . , 112n provided by a plurality of users. The plurality of user-computing devices 112a, . . . , 112n may be associated with one or more regions. The TCD system 124 may be configured to receive the plurality of user-preferences from the plurality of user-computing devices 112a, . . . , 112n, via one or more communication mediums, such as the network 110. A user-preference of the plurality of user-preferences received from a user-computing device of the plurality of user-computing devices 112a, . . . , 112n may correspond to a choice of a user of the user-computing device for non-programming content or media content (for example, specific product or service related advertisements, offers, promos, VOD, and/or the like) that the user may want to view in the programming content (e.g., a television show) on a channel, for example, a television channel, such as CNN. The programming content may include at least a video feed that corresponds to at least one of a live video feed, or a media content-based feed. In accordance with an embodiment, the TCD system 124 may receive more than one user-preferences from a single user-computing device.

At 404, targeted content to be viewed on the plurality of user-computing devices 112a, . . . , 112n may be determined based on one or more user-preferences received from each of the plurality of user-computing devices 112a, ..., 112n. The TCD system 124 may be configured to determine the targeted content for each of the plurality of user-computing devices 112a, ..., 112n based on the received one or more user-preferences. In accordance with an embodiment, the targeted content for each of the plurality of user-computing devices 112a, ..., 112n may be determined based on number of user-preferences received from each of the plurality of user-computing devices 112a, ..., 112n. For example, a user "A" of a user-computing device "CA" provides two user-preferences, one for high definition televisions and other for smartphones. In such scenario, the TCD system 124 may generate (or determine) two targeted content for the user-computing device "CA", such that one targeted content corresponds to the high definition televisions and other targeted content corresponds to the smartphones. Similarly, the TCD system 124 may generate remaining targeted content for each of remaining user-computing devices of the plurality of user-computing devices 112a, ..., 112n based on the corresponding user-preferences.

At 406, the media feed of the channel may be received from the broadcast source device 119 of a broadcast provider. The content packager 120 may be configured to receive the media feed from the broadcast source device 119, via a communication network, such as the network 110. The received media feed may correspond to a real-time media feed (for example, a live audio and/or video feed) and/or a non-real time media feed (for example, a previously recorded audio and/or video feed). The received video feed may further comprise information that may indicate one or more inbound triggers in the received video feed. Further, the content packager 120 may determine a plurality of segments of the received media feed. The plurality of segments of the received media feed may be determined in order to identify one or more available spots in the received media feed that may be utilized to stitch the non-programming content, such as the targeted content, with the programming content of the media feed. In accordance with an embodiment, the plurality of segments of the received media feed may be determined based on at least the one or more inbound triggers detected in the received media feed. For example, if one inbound trigger is detected, the content packager 120 may determine two video segments (for example a transition from the main program to an advertisement) of the received media feed. The two segments of the received media feed may be determined based on detected inbound trigger. In accordance with another embodiment, the content packager 120 may determine the plurality of segments of the received media feed that may be communicated to be viewed on each of the plurality of user-computing devices 112a, ..., 112n, based on the received one or more user-preferences from each of the plurality of user-computing devices 112a, ..., 112n.

At 408, a plurality of customized media feeds of the received media feed may be generated. The generated plurality of customized media feeds may represent a plurality of user-specific versions (or individualized versions) of the channel. The SM 122 may be configured to execute video stitching of the determined plurality of segments and the determined targeted content to generate the plurality of customized media feeds for the plurality of user-computing devices 112a, ..., 112n. For example, a user "U1" of a user-computing device "CU1" provides two user-preferences and a user "U2" of a user-computing device "CU2" provides three user-preferences. In such instances, two targeted content may be determined for the user-computing device "CU1" and three targeted content may be determined for the user-computing device "CU2".

In accordance with an embodiment, the video stitching of the plurality of segments and the determined targeted content may be executed based on one or more modifications of a programming schedule of the channel. The one or more modifications of the programming schedule of the channel may be determined based on at least a length of the received media feed, the one or more inbound triggers in the received media feed, the one or more user-preferences, a length of the determined targeted content, and/or the one or more regions. The scheduler 118 may be configured to generate the programming schedule of the channel. The programming schedule of the channel for a defined time period may be generated based on the programming content and the non-programming content that are to be communicated during the defined time period. Further, the programming schedule of the channel for the defined time period may be determined based on the length of each of the programming content and the length of each of the non-programming content that are to be communicated (e.g. a unicast, broadcast, multicast, stream) during the defined time period.

At 410, the generated plurality of customized media feeds may be communicated to be viewed on one or more of the plurality of user-computing devices 112a, ..., 112n. The packaging and distribution system 114 may be configured to communicate the generated plurality of customized media feeds on the channel to be viewed on the plurality of user-computing devices 112a, ..., 112n, via the one or more communication mediums, such as the network 110.

At 412, the communication of the generated plurality of customized media feeds on the channel to be viewed on the plurality of user-computing devices 112a, ..., 112n may be controlled. The packaging and distribution system 114 may be configured to control communication of the generated plurality of customized media feeds on the channel to be viewed on the plurality of user-computing devices 112a, ..., 112n. The communication may be controlled such that a generated customized media feed of the generated plurality of customized media feeds to be viewed on a user-computing device of the plurality of user-computing devices 112a, ..., 112n is different from remaining generated customized media feeds of the generated plurality of customized media feeds. The remaining generated customized media feeds may be viewed on remaining user-computing devices of the plurality of user-computing devices 112a, ..., 112n.

Figure 3:
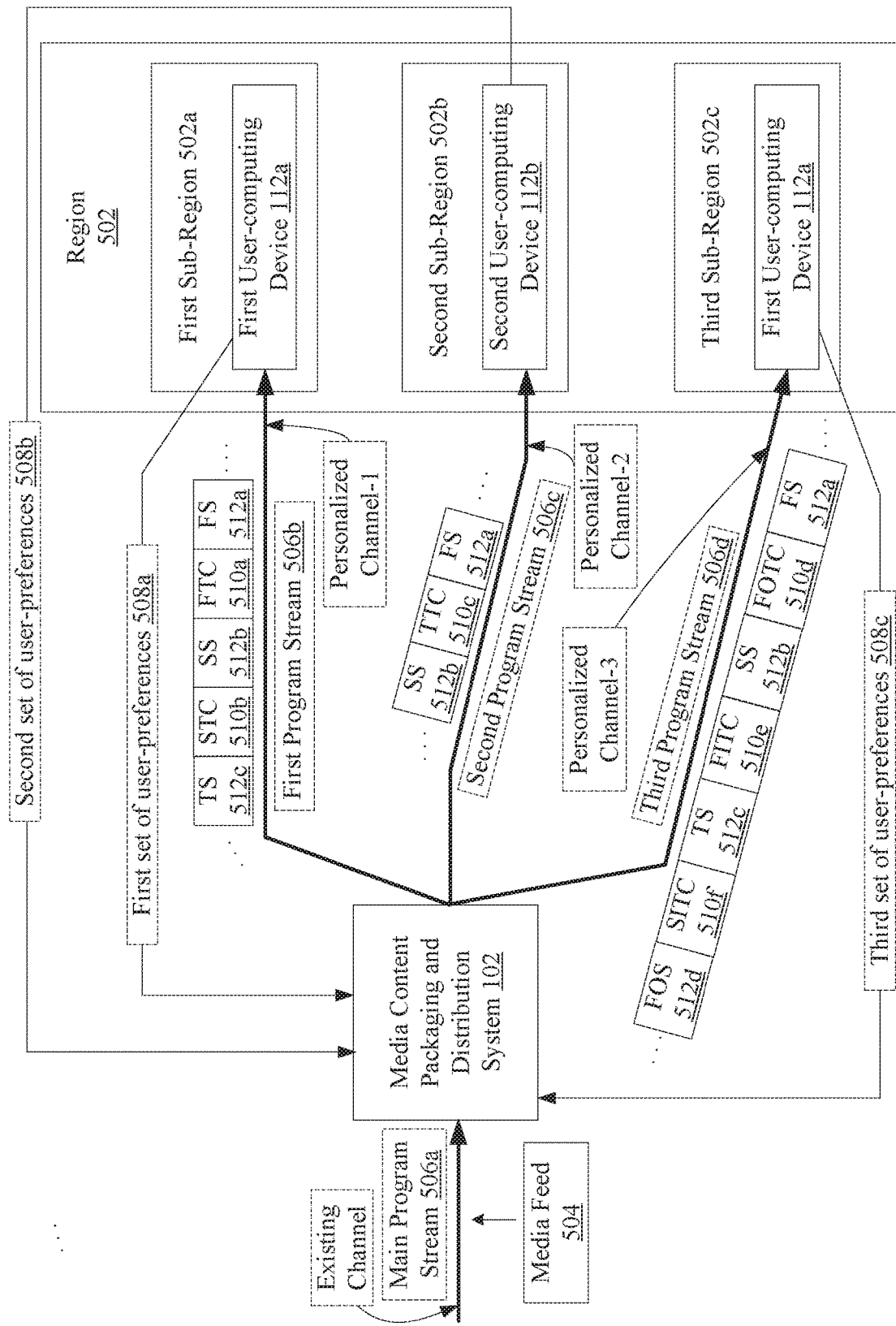
FIG. 3 is a block diagram that illustrates an exemplary scenario for dynamic channel versioning in a broadcast air chain based on user-preferences, in accordance with an exemplary embodiment of the disclosure.

FIG. 3 is a block diagram that illustrates an exemplary scenario for dynamic channel versioning in a broadcast air chain based on user-preferences, in accordance with an exemplary embodiment of the disclosure. Referring to FIG. 3, there is shown the media content packaging and distribution system 102, as described in FIG. 1A. There is further shown a first user-computing device 112a, a second user-computing device 112b, and a third user-computing device 112c. The first user-computing device 112a, the second user-computing device 112b, and the third user-computing device 112c are associated with a region 502. The region 502 includes three sub-regions, such as a first sub-region 502a, a second sub-region 502b, and a third sub-region 502c. The first user-computing device 112a, the second user-computing device 112b, and the third user-computing device 112c are further associated with the first sub-region 502a, the second sub-region 502b, and the third sub-region 502c, respectively. There is further shown a media feed 504 that is required to be distributed on a channel (e.g., a television channel, such as CNN) to be viewed by users of the first user-computing device 112a, the second user-computing device 112b, and the third user-computing device 112c. The media feed 504 may correspond to main program stream 506a, such as a program stream of an existing channel. The region 502 may be representative of at least one of a geographic region, a marketing region or zone, a demographics region, and/or a logical boundary.

There is further shown a first program stream 506b, a second program stream 506c, and a third program stream 506d. The first program stream 506b may correspond to a customized media feed generated specifically for the first user-computing device 112a. The second program stream 506c may correspond to another customized media feed generated for specifically the second user-computing device 112b. The third program stream 506d may correspond to a distinct customized media feed generated specifically for the third user-computing device 112c. There are further shown user-preferences, such as a first set of user-preferences 508a, a second set of user-preferences 508b, and a third set of user-preferences 508c, received from the first user-computing device 112a, the second user-computing device 112b, and the third user-computing device 112c, respectively, via the one or more communication mediums, such as the network 110. For ease of discussion, let the first set of user-preferences 508a comprises two user-preferences "UP1" and "UP2"), the second set of user-preferences 508b comprises one user-preference ("UP3"), and the third set of user-preferences comprises three user-preferences ("UP4", "UP5", and "UP6").

There is further shown targeted content, such as a first targeted content (FTC) 510a, a second targeted content (STC) 510b, a third targeted content (TTC) 510c, a fourth targeted content (FOTC) 510d, a fifth targeted content (FITC) 510e, and a sixth targeted content (SITC) 510f. The TCD system 124 may determine the FTC 510a and the STC 510b based on the user-preferences ("UP1" and "UP2", respectively) of the first set of user-preferences 508a. Similarly, the TTC 510c may be determined based on the user-preference ("UP3") of the second set of user-preferences 508b. The FOTC 510d, the FITC 510e, and the SITC 510f may be determined based on the user-preferences ("UP4", "UP5", and "UP6", respectively) of the third set of user-preferences 508c. There is shown different segments of the media feed 504, such as a first segment (FS) 512a, a second segment (SS) 512b, a third segment (TS) 512c, and a fourth segment (FOS) 512d, detected based on received in-bound triggers.

The SM 122 may be configured to execute video stitching of one or more of the plurality of segments of the media feed 504 and the generated targeted content to generate the customized media feed for each of the first user-computing device 112a, the second user-computing device 112b, and the third user-computing device 112c. For example, the FS 512a, the FTC 510a, the SS 512b, the STC 510b, and the TS 512c may be stitched together, as shown, to generate the customized media feed, such as the first program stream 506b (a personalized channel-1), which is communicated (such as a unicast) to be viewed on the first user-computing device 112a. Similarly, the FS 512a, the TTC 510c, and the SS 512b may be stitched together, as shown, to generate the customized media feed, such as the second program stream 506c (personalized channel-2), which is communicated (such as a unicast) to be viewed on the second user-computing device 112b. Further, the FS 512a, the FOTC 510d, the SS 512b, the FITC 510e, the TS 512c, the SITC 510f, and the FOS 512d, as shown, to generate the customized media feed, such as the third program stream 506d (a "personalized channel-3"), which is communicated to be viewed on the third user-computing device 112c. The users of each of the first user-computing device 112a, the second user-computing device 112b, and the third user-computing device 112c may view personalized content (for example, the FTC 510a and the STC 510 for the first user-computing device 112a, the TTC 510c for the second user-computing device 112b, and the FOTC 510d, the FITC 510e, and the SITC 510f for the third user-computing device 112c) in the existing channel (for example, the media feed 504).

Figure 4:
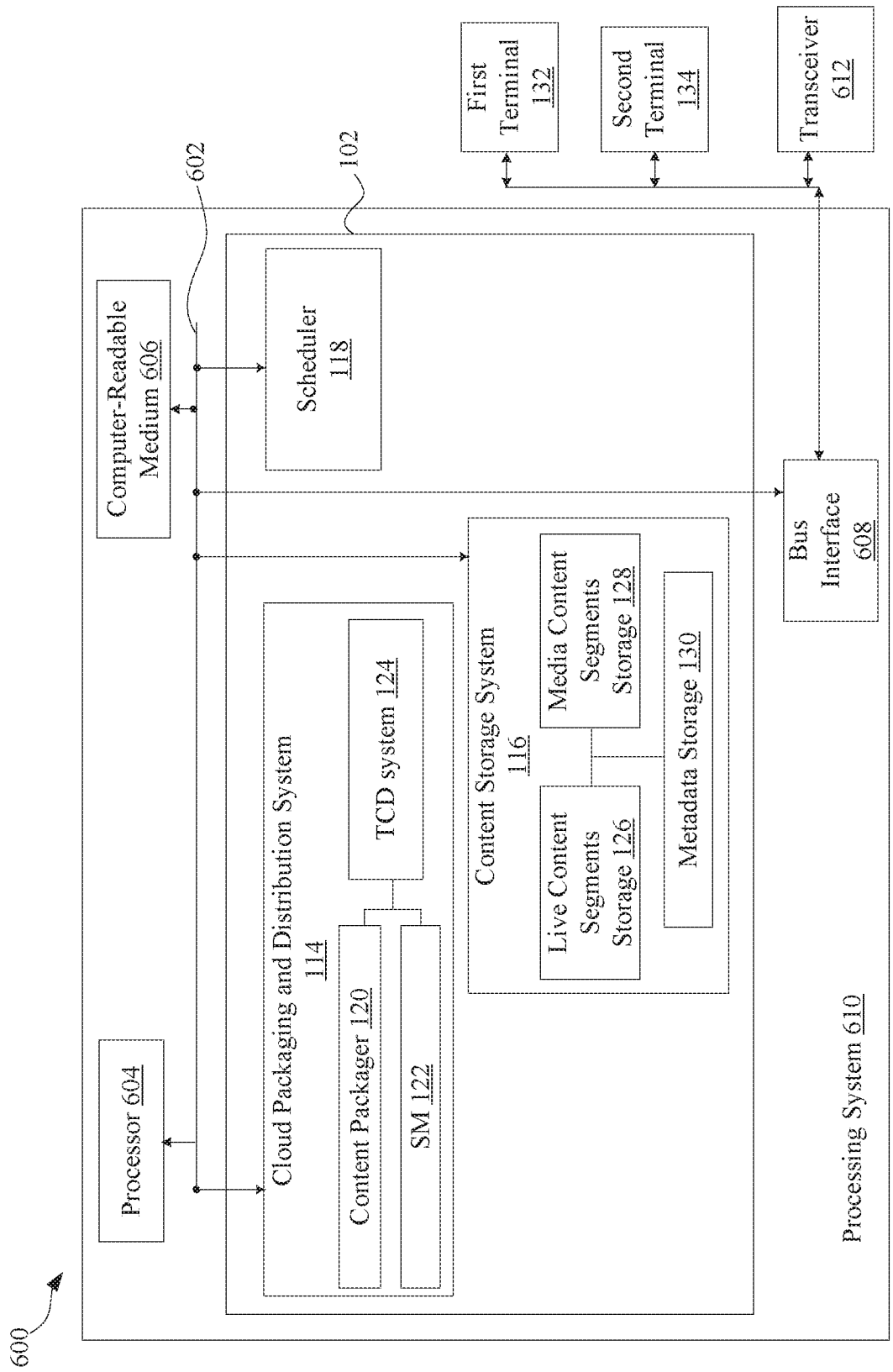
FIG. 4 is a conceptual diagram that illustrates an example of a hardware implementation for a media content packaging and distribution system employing a processing system for generating dynamic channel versioning in a broadcast air chain based on user preferences, in accordance with an exemplary embodiment of the disclosure.

FIG. 4 is a conceptual diagram illustrating an example of a hardware implementation for a television content packaging and distribution system employing a processing system for generating dynamic channel versioning in a broadcast air chain, in accordance with an exemplary embodiment of the disclosure. Referring to FIG. 4, the hardware implementation shown by a representation 600 for the media content packaging and distribution system 102 employs a processing system 610 for generating dynamic channel versioning in a broadcast air chain, in accordance with an exemplary embodiment of the disclosure, as described herein. In some examples, the processing system 610 may comprise one or more hardware processors, such as the processor 604, a non-transitory computer-readable medium 606, a hardware packaging and distribution system 114, a hardware content storage system 116, and a hardware scheduler 118. The hardware packaging and distribution system 114 may comprise a hardware content packager 120, a hardware SM 122, and a hardware TCD system 124. The hardware content storage system 116 may comprise a hardware live content segments storage 126, a hardware Media content segments storage 128, and a hardware metadata storage 130.

In this example, the media content packaging and distribution system 102 employing the processing system 610 may be implemented with bus architecture, represented generally by bus 602. The bus 602 may include any number of interconnecting buses and bridges depending on the specific implementation of the media content packaging and distribution system 102 and the overall design constraints. The bus 602 links together various circuits including the one or more processors, represented generally by the processor 604, the non-transitory computer-readable media, represented generally by the computer-readable medium 606, the hardware packaging and distribution system 114, the hardware scheduler 118, the hardware content packager 120, the hardware SM 122, and the hardware TCD system 124 which may be configured to perform one or more operations or methods described herein. A bus interface 608 provides an interface between the bus 602 and a transceiver 612. The transceiver 612 provides a means for communicating via the network 110 with various other apparatus, such as the published data sources 104a, . . . , 104n, the data collection systems 106a, . . . , 106n, the advertiser order generation systems 108a, . . . , 108n, and the plurality of user-computing devices 112a, . . . , 112n.

User terminals, such as the first terminal 132 and the second terminal 134 may comprise a keypad, display, speaker, microphone, pointing to enable a user, such as a broadcast or network provider, a marketing user, and a sales user to interact with the media content packaging and distribution system 102. The first terminal 132 may be configured to present a user interface that enables the user, such as the broadcast or network provider, to configure and interact with components, such as the content storage system 116 and the scheduler 118. Similarly, the second terminal 134 may be configured to present another user interface that enables the user, such as the marketing user or the sales user, to configure and interact with components, such as the data collection systems 106a, . . . , 106n.

The processor 604 may be configured to manage the bus 602 and general processing, including the execution of a set of instructions stored on the computer-readable medium 606. The set of instructions, when executed by the processor 604, causes the media content packaging and distribution system 102 to execute the various functions described herein for any particular apparatus. The computer-readable medium 606 may also be used for storing data that is manipulated by the processor 604 when executing the set of instructions. The computer-readable medium 606 may also be configured to store data for one or more of the hardware packaging and distribution system 114, the hardware scheduler 118, the hardware content packager 120, the hardware SM 122, and/or the hardware TCD system 124.

In an aspect of the disclosure, the processor 604, the computer-readable medium 606, or a combination of both may be configured or otherwise specially programmed to execute the operations or functionality of the hardware packaging and distribution system 114, the hardware scheduler 118, the hardware content packager 120, the hardware SM 122, the hardware TCD system 124, or various other components described herein. For example, the processor 604, the computer-readable medium 606, or a combination of both may be configured or otherwise specially programmed to perform the operations and functionality of the hardware packaging and distribution system 114, the hardware scheduler 118, the hardware content packager 120, the hardware SM 122, and the hardware TCD system 124, as described with respect to FIGS. 1A, 1B, 2, 3, 4, and 5.

Various embodiments of the disclosure comprise a media content packaging and distribution system 102 that may be configured to handle dynamic channel versioning in a broadcast air chain based on user preferences. The media content packaging and distribution system 102 may comprise, for example, the packaging and distribution system 114, the content storage system 116, and the scheduler 118. The packaging and distribution system 114 may comprise the content packager 120, the SM 122, and the TCD system 124. The content storage system 116 may comprise the live content segments storage 126, the Media content segments storage 128, and the metadata storage 130. The TCD system 124 may be configured to receive a plurality of user-preferences from the plurality of user-computing devices 112a, . . . , 112n. The TCD system 124 may further determine targeted content for the plurality of user-computing devices 112a, . . . , 112n, based on the received plurality of user-preferences. The content packager 120 may determine a plurality of segments of the media feed received from the broadcast source device 119 of a broadcast provider, based on at least the received plurality of user-preferences. The SM 122 may be configured to execute video stitching of the determined plurality of segments and the determined targeted content to generate the plurality of customized media feeds for the plurality of user-computing devices 112a, . . . , 112n. The generated plurality of customized media feeds may represent a plurality of user-specific versions of the channel. The packaging and distribution system 114 may be configured to communicate the generated plurality of customized media feeds on the channel to be viewed on the plurality of user-computing devices 112a, . . . , 112n, via the one or more communication mediums or a distribution system, such as the network 110.

Various embodiments of the disclosure may provide a non-transitory computer-readable medium having stored thereon, computer implemented instruction that when executed by a processor causes a media content packaging and distribution system to execute operations to control distribution of a channel to be viewed on a plurality of user-computing devices associated with a plurality of specific subscriber accounts. The media content packaging and distribution system 102 may execute operations comprising receiving a plurality of user-preferences from the plurality of user-computing devices 112a, . . . , 112n over one or more communication mediums, such as the network 110. A plurality of customized media feeds of a media feed of the channel may be generated based on at least the received plurality of user-preferences. The generated plurality of customized media feeds represents a plurality of user-specific versions of the channel. The generated plurality of customized media feeds to be viewed on the plurality of user-computing devices 112a, . . . , 112n may be communicated over the one or more communication mediums or a distribution system, such as the network 110.

The word "exemplary" is used herein to mean "serving as an example, instance, or illustration." Any embodiment described herein as "exemplary" is not necessarily to be construed as preferred or advantageous over other embodiments. Likewise, the term "embodiments of the disclosure" does not require that all embodiments of the disclosure include the discussed feature, advantage or mode of operation.

As utilized herein the terms "circuits" and "circuitry" refer to physical electronic components (i.e. hardware) and any software and/or firmware ("code") which may configure the hardware, be executed by the hardware, and/or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer readable storage and/or media, having stored thereon, a machine code and/or a computer program having at least one code section executable by a machine and/or a computer, thereby causing the machine and/or computer to perform the steps as described herein for dynamic channel versioning in a broadcast air chain based on user preferences.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithm, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the present disclosure has been described with reference to certain embodiments, it will be noted understood by, for example, those skilled in the art that various changes and modification could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure not be limited to the particular embodiment disclosed, but that the present disclosure will include all embodiments falling within the scope of the appended claims.

What is claimed is:
1. A system, comprising:
one or more circuits in a media content packaging and distribution system that controls creation and distribution of a channel to one or more of a plurality of user-computing devices associated with a plurality of specific subscriber accounts, the one or more circuits are configured to:
receive a plurality of user-preferences from the plurality of user-computing devices over one or more communication mediums;
collect data of one or more regions from a plurality of data sources over the one or more communication mediums;
determine a plurality of targeted contents for each user-computing device of the plurality of user-computing devices,
wherein a number of targeted contents of the plurality of targeted contents for a user-computing device of the plurality of user-computing devices is determined based on a corresponding number of user-preferences of the plurality of user-preferences for a region of the one or more regions,
wherein a first targeted content of the plurality of targeted contents is determined based on a first user-preference for a first type of a first user-computing device of the plurality of user-computing devices and a second targeted content of the plurality of targeted contents is determined based on a second user-preference for a second type of a second user-computing device of the plurality of user-computing devices,
wherein the second user-preference is different from the first user-preference, and
wherein the first type of the first user-computing device is different from the second type of the second user-computing device and the first user-computing device and the second user-computing device are of a particular user;
generate a plurality of customized media feeds of a media feed of the channel, based on at least the received plurality of user-preferences,
wherein a customized media feed of the plurality of customized media feeds comprises the same number of targeted contents as the corresponding number of user-preferences for the region, and
wherein the generated plurality of customized media feeds represent a plurality of user-specific versions of the channel; and
communicate the plurality of customized media feeds to the one or more of the plurality of user-computing devices over the one or more communication mediums.

2. The system according to claim 1, wherein the media feed corresponds to at least one of a live media feed, or a stored media feed.

3. The system according to claim 1, wherein the communication of the plurality of customized media feeds to the plurality of user-computing devices is controlled such that a customized media feed to be viewed on a user-computing device of the plurality of user-computing devices is different from remaining customized media feeds of the plurality of customized media feeds that are to be viewed on at least one remaining user-computing devices of the plurality of user-computing devices.

4. The system according to claim 1, wherein the plurality of user-computing devices is associated with the one or more regions.

5. The system according to claim 1, wherein the plurality of customized media feeds are generated based on video stitching of a plurality of segments of the media feed of the channel and the targeted content of the plurality of targeted contents for the plurality of user-computing devices, and
wherein the video stitching comprises replacement of a segment of the plurality of segments of the media feed with the targeted content.

6. The system according to claim 5, wherein the video stitching comprises addition of the targeted content among the plurality of segments of the media feed.

7. The system according to claim 5, wherein the one or more circuits are further configured to insert the determined targeted content among the plurality of segments.

8. A method, comprising:
in a media content packaging and distribution system that controls distribution of a channel to one or more of a plurality of user-computing devices associated with a plurality of specific subscriber accounts:
receiving a plurality of user-preferences from the plurality of user-computing devices over one or more communication mediums;
collecting data of one or more regions from a plurality of data sources over the one or more communication mediums;
determining a plurality of targeted contents for each user-computing device of the plurality of user-computing devices,
wherein a number of targeted contents of the plurality of targeted contents for a user-computing device of the plurality of user-computing devices is determined based on a corresponding number of user-preferences of the plurality of user-preferences for a region of the one or more regions,
wherein a first targeted content of the plurality of targeted contents is determined based on a first user-preference for a first type of a first user-computing device of the plurality of user-computing devices and a second targeted content of the plurality of targeted contents is determined based on a second user-preference for a second type of a second user-computing device of the plurality of user-computing devices,
wherein the second user-preference is different from the first user-preference, and
wherein the first type of the first user-computing device is different from the second type of the second user-computing device and the first user-computing device and the second user-computing device are of a particular user;
generating a plurality of customized media feeds of a media feed of the channel, based on at least the received plurality of user-preferences,
wherein a customized media feed of the plurality of customized media feeds comprises the same number of targeted contents as the corresponding number of user-preferences for the region, and
wherein the generated plurality of customized media feeds represents a plurality of user-specific versions of the channel; and
communicating the plurality of customized media feeds to the one or more of the plurality of user-computing devices over the one or more communication mediums.

9. The method according to claim 8, wherein the media feed corresponds to at least one of a live media feed, or a stored media feed.

10. The method according to claim 8, wherein the communication of the plurality of customized media feeds to the plurality of user-computing devices is controlled such that a customized media feed of the plurality of customized media feeds to be viewed on a user-computing device of the plurality of user-computing devices is different from remaining customized media feeds of the plurality of customized media feeds that are to be viewed on at least one remaining user-computing devices of the plurality of user-computing devices.

11. The method according to claim 8, wherein the plurality of user-computing devices is associated with the one or more regions.

12. The method according to claim 8, further comprising generating the plurality of customized media feeds based on video stitching of a plurality of segments of the media feed of the channel and the targeted content of the plurality of targeted contents for the plurality of user-computing devices,
wherein the video stitching comprises replacement of a segment of the plurality of segments of the media feed with the targeted content.

13. The method according to claim 12, wherein the video stitching comprises addition of the targeted content among the plurality of segments of the media feed.

14. The method according to claim 12, further comprising inserting the determined targeted content among the plurality of segments.

15. A non-transitory computer-readable medium having stored thereon, computer-executable instruction executable by one or more processors that cause the computer to execute operations, the operations comprising:
in a media content packaging and distribution system that controls distribution of a channel to one or more of a plurality of user-computing devices associated with a plurality of specific subscriber accounts:
receiving a plurality of user-preferences from the plurality of user-computing devices over one or more communication mediums;
collecting data of one or more regions from a plurality of data sources over the one or more communication mediums;
determining a plurality of targeted contents for each user-computing device of the plurality of user-computing devices,
wherein a number of targeted contents of the plurality of targeted contents for a user-computing device of the plurality of user-computing devices is determined based on a corresponding number of user-preferences of the plurality of user-preferences for a region of the one or more regions, wherein a first targeted content of the plurality of targeted contents is determined based on a first user-preference for a first type of a first user-computing device of the plurality of user-computing devices and a second targeted content of the plurality of targeted contents is determined based on a second user-preference for a second type of a second user-computing device of the plurality of user-computing devices, wherein the second user-preference is different from the first user-preference, and wherein the first type of the first user-computing device is different from the second type of the second user-computing device and the first user-computing device and the second user-computing device are of a particular user;

generating a plurality of customized media feeds of a media feed of the channel, based on at least the received plurality of user-preferences, wherein a customized media feed of the plurality of customized media feeds comprises the same number of targeted contents as the corresponding number of user-preferences for the region, and wherein the generated plurality of customized media feeds represents a plurality of user-specific versions of the channel; and communicating the plurality of customized media feeds to the one or more of the plurality of user-computing devices over the one or more communication mediums.

16. The non-transitory computer-readable medium according to claim 15, wherein the media feed corresponds to at least one of a live media feed, or a stored media feed.

17. The non-transitory computer-readable medium according to claim 15, wherein the communication of the plurality of customized media feeds to the plurality of user-computing devices is controlled such that a customized media feed of the plurality of customized media feeds to be viewed on a user-computing device of the plurality of user-computing devices is different from remaining customized media feeds of the plurality of customized media feeds that are to be viewed on at least one remaining user-computing devices of the plurality of user-computing devices.

18. The non-transitory computer-readable medium to claim 15, wherein the plurality of user-computing devices is associated with one or more regions.

* * * * *